(12) United States Patent
Nakajo

(10) Patent No.: US 8,793,590 B2
(45) Date of Patent: Jul. 29, 2014

(54) INFORMATION PROCESSING APPARATUS, INFORMATION PROCESSING METHOD, AND PROGRAM

(75) Inventor: Naoki Nakajo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 145 days.

(21) Appl. No.: 13/437,255

(22) Filed: Apr. 2, 2012

(65) Prior Publication Data

US 2012/0254785 A1    Oct. 4, 2012

(30) Foreign Application Priority Data

Mar. 31, 2011    (JP) ................... 2011-077889

(51) Int. Cl.
*G06F 3/048* (2013.01)
*G06Q 10/10* (2012.01)

(52) U.S. Cl.
CPC .............. *G06F 3/048* (2013.01); *G06Q 10/109* (2013.01); *G06Q 10/1093* (2013.01); *Y10S 715/963* (2013.01)
USPC ............ 715/751; 715/963; 707/610; 707/705

(58) Field of Classification Search
CPC ... G06F 3/048; G06Q 10/109; G06Q 10/1093
USPC ........................ 715/963, 751; 707/610, 705
See application file for complete search history.

(56) References Cited

U.S. PATENT DOCUMENTS

| | | | | |
|---|---|---|---|---|
| 7,840,543 | B2 * | 11/2010 | Guiheneuf et al. | 707/695 |
| 7,904,321 | B2 * | 3/2011 | Moore et al. | 705/7.18 |
| 2006/0010382 | A1 * | 1/2006 | Ejiri et al. | 715/712 |
| 2008/0046311 | A1 * | 2/2008 | Shahine et al. | 705/14 |
| 2008/0134344 | A1 * | 6/2008 | McBrearty | 726/28 |
| 2008/0161044 | A1 * | 7/2008 | Baker et al. | 455/556.1 |

FOREIGN PATENT DOCUMENTS

| | | |
|---|---|---|
| JP | 2006050176 A | 2/2006 |
| JP | 2009140453 A | 6/2009 |

* cited by examiner

*Primary Examiner* — Ting Lee
(74) *Attorney, Agent, or Firm* — Nutter McClennon & Fish LLP

(57) ABSTRACT

An event setting section sets calendars or accounts based on operation contents from an operation input receiving unit, and stores a list of the set calendars or accounts in a schedule database. In addition, the event setting section sets events in a calendar based on operation contents from the operation input receiving unit, and stores a list of the set events in the schedule database. An image correlation section stores image data supplied from an image input unit in an image database, and correlates (shares) the image data with the event list stored in the schedule database based on photographing information (photographing time, camera ID, and the like) accompanied by the image data.

14 Claims, 19 Drawing Sheets

FIG. 5

| CALENDAR 0: WHOLE SCHOOL CALENDAR |
| --- |
| CALENDAR 1: SCHOOL YEAR (FIRST GRADE) CALENDAR |
| CALENDAR 2: SCHOOL YEAR (SECOND GRADE) CALENDAR |
| CALENDAR 3: SCHOOL YEAR (THIRD GRADE) CALENDAR |
| CALENDAR 4: CLASS (FIRST GRADE, CLASS 1) CALENDAR |

⋮

| CALENDAR A: CLASS (SECOND GRADE, CLASS 2) CALENDAR |
| --- |
| CALENDAR B: CLASS (SECOND GRADE, CLASS 3) CALENDAR |

⋮

| CALENDAR C: SUBJECT OF STUDY (JAPANESE TEACHER B) CALENDAR |
| --- |
| CALENDAR D: SUBJECT OF STUDY (ENGLISH TEACHER C) CALENDAR |

⋮

| CALENDAR E: CLUB ACTIVITY (SOCCER CLUB) CALENDAR |
| --- |

⋮

| CALENDAR F: SCHOOL TRIP, SECOND GRADE, CLASS 3, GROUP B CALENDAR |
| --- |
| CALENDAR G: SCHOOL TRIP, SECOND GRADE, CLASS 3, GROUP C CALENDAR |

FIG. 7

| |
|---|
| NAME: VICE-PRINCIPAL A<br>BELONGING CALENDAR:<br>BELONGING ALL CALENDARS (AUTHORITY: ADMINISTRATOR) |
| NAME: TEACHER B (IN CHARGE OF SECOND GRADE,<br>       CLASS 2, HEAD TEACHER OF SECOND GRADE, JAPANESE)<br>BELONGING CALENDAR:<br>2 (AUTHORITY: ADMINISTRATOR)<br>A (AUTHORITY: ADMINISTRATOR)<br>C (AUTHORITY: ADMINISTRATOR)<br>ANY OTHER CALENDAR (AUTHORITY: REFERENCE, NO TERM) |
| NAME: TEACHER C (IN CHARGE OF SECOND GRADE,<br>       CLASS 3, ENGLISH, SOCCER CLUB ADVISER)<br>BELONGING CALENDAR:<br>B (AUTHORITY: ADMINISTRATOR)<br>D (AUTHORITY: ADMINISTRATOR)<br>E (AUTHORITY: ADMINISTRATOR)<br>F (AUTHORITY: ADMINISTRATOR)<br>ANY OTHER CALENDAR (AUTHORITY: REFERENCE, NO TERM) |
| NAME: STUDENT D (SECOND GRADE, CLASS 2, SOCCER CLUB HEAD)<br>BELONGING CALENDAR: TERM: 04.01.2009. TO 03.31.2012<br>0 (AUTHORITY: REFERENCE)<br>2 (AUTHORITY: REFERENCE)<br>A (AUTHORITY: REFERENCE)<br>E (AUTHORITY: USER) |
| NAME: STUDENT E (SECOND GRADE, CLASS 3, SCHOOL TRIP GROUP B HEAD)<br>BELONGING CALENDAR: TERM: 04.01.2009. TO 03.31.2012<br>0 (AUTHORITY: REFERENCE)<br>2 (AUTHORITY: REFERENCE)<br>B (AUTHORITY: REFERENCE)<br>F (AUTHORITY: USER) |
| NAME: STUDENT F (SECOND GRADE, CLASS 3,<br>       SOCCER CLUB, SCHOOL TRIP GROUP B)<br>BELONGING CALENDAR: TERM: 04.01.2009. TO 03.31.2012<br>0 (AUTHORITY: REFERENCE)<br>2 (AUTHORITY: REFERENCE)<br>B (AUTHORITY: REFERENCE)<br>E (AUTHORITY: REFERENCE)<br>F (AUTHORITY: REFERENCE) |
| NAME: STUDENT G (SECOND GRADE, CLASS 3, SCHOOL TRIP GROUP C)<br>BELONGING CALENDAR: TERM: 04.01.2009. TO 03.31.2012<br>0 (AUTHORITY: REFERENCE)<br>2 (AUTHORITY: REFERENCE)<br>B (AUTHORITY: REFERENCE)<br>G (AUTHORITY: REFERENCE) |

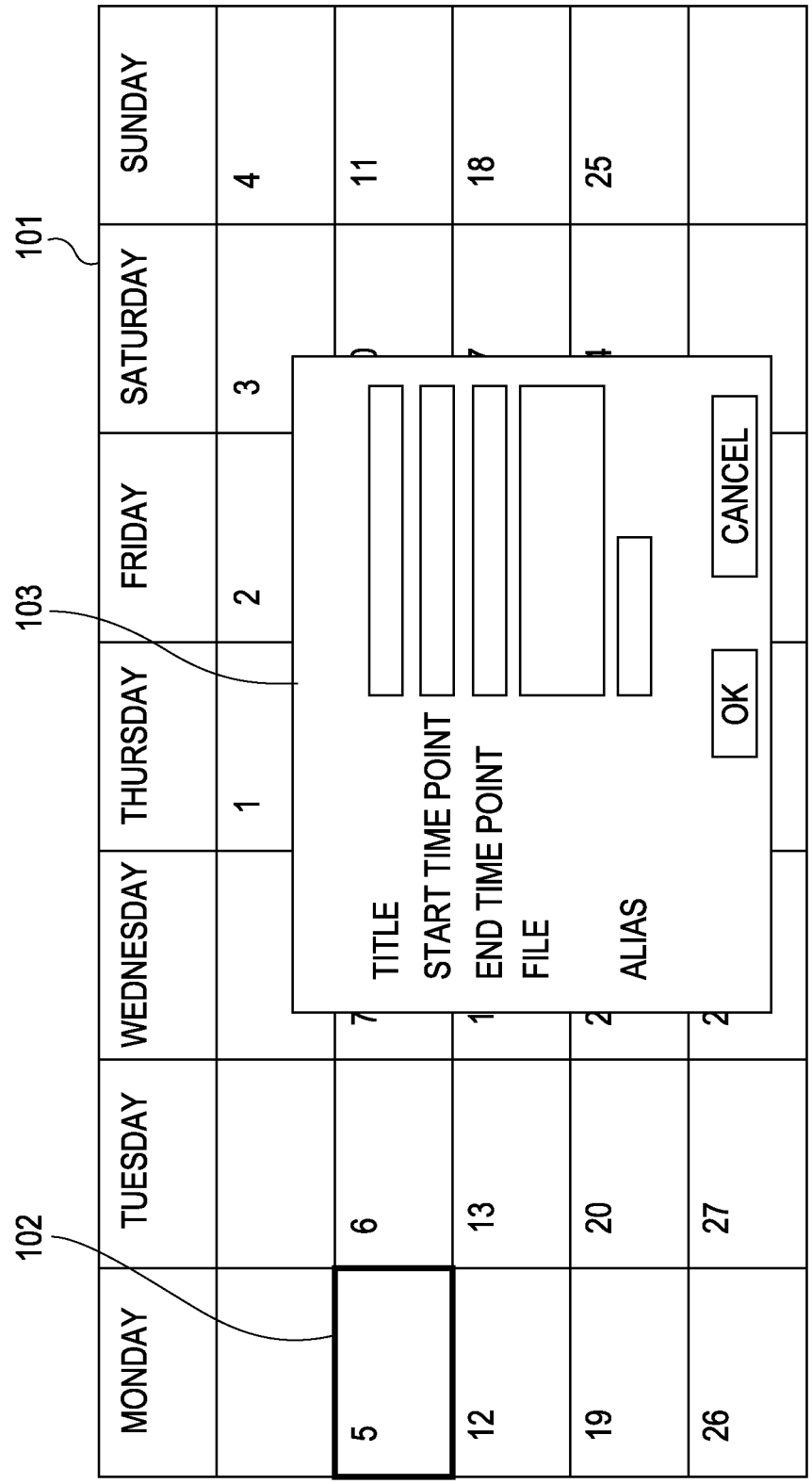

FIG. 10

| |
|---|
| EVENT 1 (CALENDAR 0)<br>NAME: SCHOOL ASSEMBLY<br>START TIME POINT: 04/03/2010 09:00<br>END TIME POINT: 04/03/2010 09:45<br>ATTRIBUTE: |
| EVENT 2 (CALENDAR 0)<br>NAME: SCHOOL MEALS<br>START TIME POINT: 04/03/2010 12:00<br>END TIME POINT: 04/03/2010 13:00<br>ATTRIBUTE: REPETITION ON WEEKDAYS |
| EVENT 3 (CALENDAR C)<br>NAME: JAPANESE, SECOND GRADE, CLASS 2<br>START TIME POINT: 04/03/2010 11:00<br>END TIME POINT: 04/03/2010 11:45<br>ATTRIBUTE: REPLETION ON MONDAYS |
| EVENT 4 (CALENDAR D)<br>NAME: ENGLISH, SECOND GRADE, CLASS 2<br>START TIME POINT: 04/03/2010 13:00<br>END TIME POINT: 04/03/2010 13:45<br>ATTRIBUTE: REPLETION ON MONDAYS |
| EVENT 5 (CALENDAR A)<br>NAME: JAPANESE, SECOND GRADE, CLASS 2<br>START TIME POINT:04/03/2010 11:00<br>END TIME POINT: 04/03/2010 11:45<br>ATTRIBUTE: ALIAS OF EVENT 3 |
| EVENT 6 (CALENDAR A)<br>NAME: ENGLISH, SECOND GRADE, CLASS 2<br>START TIME POINT: 04/03/2010 13:00<br>END TIME POINT: 04/03/2010 13:45<br>ATTRIBUTE: ALIAS OF EVENT 4 |
| EVENT 7 (CALENDAR 2)<br>NAME: SCHOOL TRIP<br>START TIME POINT: 04/05/2010 ALL DAY LONG<br>END TIME POINT: 04/07/2010 ALL DAY LONG<br>ATTRIBUTE: |
| EVENT 8 (CALENDAR 2)<br>NAME: GATHERING<br>START TIME POINT: 04/05/2010 08:00<br>END TIME POINT: 04/05/2010 08:30<br>ATTRIBUTE: DEPENDENCE ON EVENT 7 |
| EVENT 9 (CALENDAR 2)<br>NAME: FREE ACTIVITIES<br>START TIME POINT: 04/06/2010 13:15<br>END TIME POINT: 04/06/2010 18:15<br>ATTRIBUTE: DEPENDENCE ON EVENT 7 |
| EVENT 10 (CALENDAR A)<br>NAME: SCHOOL TRIP<br>START TIME POINT: 04/05/2010 ALL DAY LONG<br>END TIME POINT: 04/07/2010 ALL DAY LONG<br>ATTRIBUTE: ALIAS OF EVENT 7 |
| EVENT 11 (CALENDAR F)<br>NAME: FREE ACTIVITIES<br>START TIME POINT: 04/06/2010 13:15<br>END TIME POINT: 04/06/2010 18:15<br>ATTRIBUTE: ALIAS OF EVENT 9 |

FIG. 11

| | 6/5 (MONDAY) | 6/6 (TUESDAY) | 6/7 (WEDNESDAY) | 6/8 (THURSDAY) | 6/9 (FRIDAY) | 6/10 (SATURDAY) | 6/11 (SUNDAY) |
|---|---|---|---|---|---|---|---|
| 9:00 | | | | | | | |
| 10:00 | | | | ... | | | |
| 11:00 | JAPANESE | | | | | | |
| 12:00 | ENGLISH | | | | | | |
| 13:00 | | | | | | | |

| CALENDAR 0: WHOLE SCHOOL CALENDAR |
|---|
| CALENDAR 1: SCHOOL YEAR (FIRST GRADE) CALENDAR |
| CALENDAR 2: SCHOOL YEAR (SECOND GRADE) CALENDAR |
| CALENDAR 3: SCHOOL YEAR (THIRD GRADE) CALENDAR |
| CALENDAR 4: CLASS (FIRST GRADE, CLASS 1) CALENDAR |

⋮

| CALENDAR A: CLASS (SECOND GRADE, CLASS 2) CALENDAR |
|---|
| CALENDAR B: CLASS (SECOND GRADE, CLASS 3) CALENDAR |

⋮

| CALENDAR C: SUBJECT OF STUDY (JAPANESE TEACHER B) CALENDAR |
|---|
| CALENDAR D: SUBJECT OF STUDY (ENGLISH TEACHER C) CALENDAR |

⋮

| CALENDAR E: CLUB ACTIVITY (SOCCER CLUB) CALENDAR |
|---|

⋮

| CALENDAR F: SCHOOL TRIP, SECOND GRADE, CLASS 3, GROUP B CALENDAR |
|---|
| CALENDAR G: SCHOOL TRIP, SECOND GRADE, CLASS 3, GROUP C CALENDAR |

⋮

| CALENDAR H: SCHOOL TRIP CRITERION CALENDAR |
|---|
| CALENDAR I: SCHOOL TRIP, COURSE A CALENDAR |
| CALENDAR J: SCHOOL TRIP, COURSE B CALENDAR |

FIG. 13

| |
|---|
| EVENT 7 (CALENDAR H)<br>NAME: SCHOOL TRIP<br>START TIME POINT: 04/05/2010 ALL DAY LONG<br>END TIME POINT: 04/07/2010 ALL DAY LONG<br>ATTRIBUTE: |
| EVENT 8 (CALENDAR H)<br>NAME: GATHERING<br>START TIME POINT: 04/05/2010 08:00<br>END TIME POINT: 04/05/2010 08:30<br>ATTRIBUTE: DEPENDENCE ON EVENT 7 |
| EVENT 9 (CALENDAR I)<br>NAME: SCHOOL TRIP<br>START TIME POINT: 04/05/2010 ALL DAY LONG<br>END TIME POINT: 04/07/2010 ALL DAY LONG<br>ATTRIBUTE: ALIAS OF EVENT 7 |
| EVENT 10 (CALENDAR I)<br>NAME: MOVEMENT (BUS)<br>START TIME POINT: 04/05/2010 13:15<br>END TIME POINT: 04/05/2010 13:45<br>ATTRIBUTE: DEPENDENCE ON EVENT 9 |
| EVENT 11 (CALENDAR I)<br>NAME: XXX TEMPLE<br>START TIME POINT: 04/05/2010 14:00<br>END TIME POINT: 04/05/2010 14:45<br>ATTRIBUTE: DEPENDENCE ON EVENT 9 |
| EVENT 12 (CALENDAR I)<br>NAME: MOVEMENT (BUS)<br>START TIME POINT: 04/05/2010 15:00<br>END TIME POINT: 04/05/2010 15:30<br>ATTRIBUTE: DEPENDENCE ON EVENT 9 |
| EVENT 13 (CALENDAR I)<br>NAME: XXX MUSEUM<br>START TIME POINT: 04/05/2010 15:45<br>END TIME POINT: 04/05/2010 16:30<br>ATTRIBUTE: DEPENDENCE ON EVENT 9 |
| EVENT 14 (CALENDAR I)<br>NAME: MOVEMENT (BUS)<br>START TIME POINT: 04/05/2010 16:45<br>END TIME POINT: 04/05/2010 17:15<br>ATTRIBUTE: DEPENDENCE ON EVENT 9 |
| EVENT 15 (CALENDAR J)<br>NAME: SCHOOL TRIP<br>START TIME POINT: 04/05/2010 ALL DAY LONG<br>END TIME POINT: 04/07/2010 ALL DAY LONG<br>ATTRIBUTE: ALIAS OF EVENT 7 |
| EVENT 16 (CALENDAR I)<br>NAME: MOVEMENT (BUS)<br>START TIME POINT: 04/05/2010 13:15<br>END TIME POINT: 04/05/2010 13:45<br>ATTRIBUTE: DEPENDENCE ON EVENT 15 |
| EVENT 17 (CALENDAR J)<br>NAME: XXX MUSEUM<br>START TIME POINT: 04/05/2010 14:00<br>END TIME POINT: 04/05/2010 14:45<br>ATTRIBUTE: DEPENDENCE ON EVENT 15 |

FIG. 14

| Time | 4/3 (MONDAY) | 4/4 (TUESDAY) | 4/5 (WEDNESDAY) | 4/6 (THURSDAY) | 4/7 (FRIDAY) |
|---|---|---|---|---|---|
| | | | | SCHOOL TRIP | |
| 7:00 | | | | | |
| 8:00 | | | | LODGMENT IN XXX HOTEL / BREAKFAST | LODGMENT IN XXX HOTEL / BREAKFAST |
| 9:00 | WHOLE ASSEMBLY | GEOGRAPHY | GATHERING (XXX STATION) | MOVEMENT (BUS) | MOVEMENT (BUS) |
| 10:00 | MATHEMATICS | ENGLISH | MOVEMENT (TRAM) | XXX COAST | XXX SHRINE |
| 11:00 | JAPANESE | MATHEMATICS | | | MOVEMENT (BUS) |
| 12:00 | SCHOOL MEAL | SCHOOL MEALS | LUNCH XXX RESTAURANT | LUNCH XXX RESTAURANT | LUNCH XXX RESTAURANT |
| 13:00 | ENGLISH | JAPANESE | MOVEMENT (BUS) | FREE ACTIVITIES / BREAKFAST | MOVEMENT (BUS) |
| 14:00 | PHYSICAL EDUCATION | BIOLOGY | XXX MUSEUM | XXX PARK | MOVEMENT (TRAM) |
| 15:00 | JAPANESE HISTORY | CLASSICS | MOVEMENT (BUS) | | |
| 16:00 | [CLUB ACTIVITY] SOCCER CLUB | [CLUB ACTIVITY] SOCCER CLUB | XXX TEMPLE | PURCHASE | DISPERSION (SCHOOL GATE) |
| 17:00 | | | MOVEMENT (BUS) | MOVEMENT | |
| 18:00 | | | LODGMENT IN XXX HOTEL / SUPPER | SUPPER | |
| 19:00 | | | FREE ACTIVITIES | LODGMENT IN XXX HOTEL / FREE ACTIVITIES | |
| 20:00 | | | SLEEPING | SLEEPING | |
| 21:00 | | | | | |

| |
|---|
| CALENDAR 0: COMPANY CALENDAR |
| CALENDAR 1: EXECUTIVE CALENDAR |
| CALENDAR 2: DIVISION HEAD CALENDAR |
| CALENDAR 3: SALES DIVISION CALENDAR |
| CALENDAR 4: PLANNING DIVISION CALENDAR |
| CALENDAR 5: SALES DIVISION, SECTION 1 CALENDAR |
| CALENDAR 6: SALES DIVISION, SECTION 2 CALENDAR |
| CALENDAR 7: PLANNING DIVISION, SECTION 1 CALENDAR |
| CALENDAR 8: PLANNING DIVISION, SECTION 2 CALENDAR |
| CALENDAR A: PROJECT A CALENDAR |
| CALENDAR B: PROJECT B CALENDAR |

FIG. 16

| |
|---|
| NAME: MANAGING DIRECTOR (AUTHORITY: LEVEL A)<br>BELONGING CALENDAR:<br>CALENDAR 0: COMPANY CALENDAR<br>CALENDAR 1: EXECUTIVE CALENDAR<br>CALENDAR 2: DIVISION HEAD CALENDAR |
| NAME: SALES DIVISION HEAD (AUTHORITY: LEVEL B)<br>BELONGING CALENDAR:<br>CALENDAR 0: COMPANY CALENDAR<br>CALENDAR 2: DIVISION HEAD CALENDAR<br>CALENDAR 3: SALES DIVISION CALENDAR<br>CALENDAR A: PROJECT A CALENDAR<br>CALENDAR B: PROJECT B CALENDAR |
| NAME: PLANNING DIVISION HEAD (AUTHORITY: LEVEL B)<br>BELONGING CALENDAR:<br>CALENDAR 0: COMPANY CALENDAR<br>CALENDAR 2: DIVISION HEAD CALENDAR<br>CALENDAR 4: PLANNING DIVISION CALENDAR<br>CALENDAR A: PROJECT A CALENDAR<br>CALENDAR B: PROJECT B CALENDAR |
| NAME: SALES DIVISION, SECTION 1 CHIEF (AUTHORITY: LEVEL C)<br>BELONGING CALENDAR:<br>CALENDAR 0: COMPANY CALENDAR<br>CALENDAR 3: SALES DIVISION CALENDAR<br>CALENDAR 5: SALES DIVISION, SECTION 1 CALENDAR<br>CALENDAR A: PROJECT A CALENDAR |
| NAME: PLANNING DIVISION, SECTION 2 CHIEF (AUTHORITY: LEVEL C)<br>BELONGING CALENDAR<br>CALENDAR 0: COMPANY CALENDAR<br>CALENDAR 4: PLANNING DIVISION CALENDAR<br>CALENDAR 8: PLANNING DIVISION, SECTION 2 CALENDAR<br>CALENDAR A: PROJECT B CALENDAR |
| NAME: SALES DIVISION, SECTION 1 SENIOR STAFF C (AUTHORITY: LEVEL D)<br>BELONGING CALENDAR<br>CALENDAR 0: COMPANY CALENDAR<br>CALENDAR 3: SALES DIVISION CALENDAR<br>CALENDAR 5: SALES DIVISION, SECTION 1 CALENDAR<br>CALENDAR A: PROJECT A CALENDAR |
| NAME: PLANNING DIVISION, SECTION 2 D (AUTHORITY: LEVEL E)<br>BELONGING CALENDAR<br>CALENDAR 0: COMPANY CALENDAR<br>CALENDAR 4: PLANNING DIVISION CALENDAR<br>CALENDAR 8: PLANNING DIVISION, SECTION 2 CALENDAR<br>CALENDAR A: PROJECT A CALENDAR |

FIG. 17

| |
|---|
| EVENT 1 (CALENDAR 0)<br>NAME: HOLIDAY<br>START TIME POINT: 04/06/2010 ALL DAY LONG<br>END TIME POINT: 04/06/2010 ALL DAY LONG<br>ATTRIBUTE: |
| EVENT 2 (CALENDAR 0)<br>NAME: SENIOR STAFF TRAINING<br>START TIME POINT: 04/03/2010 12:00<br>END TIME POINT: 04/03/2010 13:00<br>ATTRIBUTE: RESTRICTION = SALES DIVISION, SECTION 1, D, ··· |
| EVENT 3 (CALENDAR 2)<br>NAME: SECTION DIRECTOR REGULAR MEETING<br>START TIME POINT: 04/03/2010 10:00<br>END TIME POINT: 04/03/2010 12:00<br>ATTRIBUTE: REPETITION ON MONDAYS |
| EVENT 4 (CALENDAR 3)<br>NAME: SECTION DIRECTOR REGULAR MEETING<br>START TIME POINT: 04/03/2010 10:00<br>END TIME POINT: 04/03/2010 12:00<br>ATTRIBUTE: ALIAS OF EVENT 3 |
| EVENT 5 (CALENDAR 3)<br>NAME: MARKETING MEETING<br>START TIME POINT: 04/04/2010 13:00<br>END TIME POINT: 04/04/2010 15:00<br>ATTRIBUTE: |
| EVENT 6 (CALENDAR 4)<br>NAME: PLANNING AND RESEARCH MEETING<br>START TIME POINT: 04/06/2010 13:00<br>END TIME POINT: 04/06/2010 15:00<br>ATTRIBUTE: |
| EVENT 7 (CALENDAR 5)<br>NAME: SALES DIVISION, SECTION 1 REGULAR MEETING<br>START TIME POINT: 04/06/2010 13:00<br>END TIME POINT: 04/06/2010 15:00<br>ATTRIBUTE: |
| EVENT 8 (CALENDAR A)<br>NAME: PROJECT A, REPORT MEETING<br>START TIME POINT: 04/07/2010 09:30<br>END TIME POINT: 04/07/2010 12:00<br>ATTRIBUTE: |
| EVENT 9 (CALENDAR B)<br>NAME: PROJECT B, STRATEGY MEETING<br>START TIME POINT: 04/07/2010 09:30<br>END TIME POINT: 04/07/2010 12:30<br>ATTRIBUTE: |
| EVENT 10 (CALENDAR 2)<br>NAME: MARKETING MEETING<br>START TIME POINT: 04/04/2010 13:00<br>END TIME POINT: 04/04/2010 15:00<br>ATTRIBUTE: ALIAS OF EVENT 5 |
| EVENT 11 (CALENDAR 2)<br>NAME: PLANNING AND RESEARCH MEETING<br>START TIME POINT: 04/06/2010 13:00<br>END TIME POINT: 04/06/2010 15:00<br>ATTRIBUTE: ALIAS OF EVENT 6 |
| EVENT 12 (CALENDAR 4)<br>NAME: MARKETING MEETING<br>START TIME POINT: 04/04/2010 13:00<br>END TIME POINT: 04/04/2010 15:00<br>ATTRIBUTE: ALIAS OF EVENT 10 |
| EVENT 13 (CALENDAR 3)<br>NAME: PLANNING AND RESEARCH MEETING<br>START TIME POINT: 04/06/2010 13:00<br>END TIME POINT: 04/06/2010 15:00<br>ATTRIBUTE: ALIAS OF EVENT 11 |

INFORMATION PROCESSING APPARATUS, INFORMATION PROCESSING METHOD, AND PROGRAM

BACKGROUND

1. Technical Field

The present invention relates to an information processing apparatus, and an information processing method, and a program, and more particularly to an information processing apparatus, and an information processing method, and a program, enabling information about events correlated with each other between a plurality of calendars to be shared and enabling an administrator to set an access right, thereby reducing an operation burden on a user.

2. Related Art

For example, in application software for managing a calendar or a schedule of a personal computer or a mobile phone, it is relatively simply realized to correlate photographing time of picture (image) data with an event in the schedule table corresponding thereto. In addition, it is typically performed to set an access right to the picture so as to share it between a plurality of users. Further, it is possible to share the picture correlated with an event through a combination of both the techniques.

For example, JP-A-2006-50176 has proposed a technique where a captured image and a schedule are in tandem with each other on the calendar.

However, in the technique disclosed in JP-A-2006-50176, even if a plurality of calendars exist, it is necessary to register an event for each calendar and set an access right for each registered event, and thus there is a problem in that the operation is burdensome.

In addition, since it is necessary for a user of the calendar to set an access right instead of an administrator who sets the calendar, operation by a user unaccustomed to the access right conception hinders operability improvement.

However, in a company, there are present various security levels such as management, a general manager, a section manager and general staff, and it is necessary that timetables (calendars) are shared between each hierarchy or division. In addition, the security setting is detailed, complicated, and is frequently changed.

SUMMARY

An advantage of some aspects of the invention is to provide an information processing apparatus, and an information processing method, and a program, capable of reducing an operation burden on a user by sharing events and information related to the events between a plurality of calendars and by an administrator setting an access right.

According to an aspect of the invention, there is provided an information processing apparatus where a calendar is displayed and information can be input to the calendar, including an event setting portion that sets an event so as to correspond to the date of the calendar; and an access right setting portion that sets an access right to the calendar or the event, wherein, if the event is also set in another calendar, the event setting portion generates an event having only correlation with the event so as to be set in another calendar, and, if the contents of the event are changed, also reflects the changed contents thereof in the contents of the event having only correlation with the event.

As above, an access right is set to a calendar or an event, and there is no necessity of finely setting events in each calendar even if a plurality of calendars are prepared, thereby expecting an improvement in operability.

The information processing apparatus may further include an information storage portion that stores the event set by the event setting portion along with the date. Thereby, it is possible to manage a calendar in which events are set.

The information processing apparatus may further include a sharing setting portion that shares a file or image data in the event as information related to the event. If the event having only correlation with the event is set in another calendar, the event setting portion may also reflect the sharing of the file or the image data in the event having only correlation with the event. Thereby, it is possible to easily share files or image data in a plurality of events.

The information processing apparatus may further include a sharing propriety setting portion that sets whether or not the image data is shared when the event is set, and, the sharing setting portion may share the image data in the event at the same time as photographing if the image data is set to be shared by the sharing propriety setting portion. Thereby, it is possible to share an image in real time at the same time as capturing.

The sharing propriety setting portion may set either sharing of the image data or non-sharing of the image data as a default value. Thereby, it is possible to simplify setting operations which tend to be burdensome.

The information processing apparatus may further include a selection portion that selects which access right to the calendar or the event is set, and the access right setting portion may set an access right based on the selection performed by the selection portion. Thereby, it is possible to change not only an access right to a calendar but also an access right to an event separately.

The selection portion may select either the calendar or the event as a default value. Thereby, it is possible to simplify setting operations which tend to be burdensome.

The information processing apparatus may further include a display control portion that controls display of the calendar including the event set by the event setting portion, and the display control portion may change background colors, or styles, colors or sizes of fonts according to an event having only correlation with the event or a security level of the event. Thereby, it is possible to visually clearly represent the event having only correlation with the event or the security level of the event.

In a case where there is an event overlapping the event having only correlation with the event when synchronization with another calendar system managing the event is performed, the event setting portion may omit either the event of an entity side of the event or the event side having only correlation with the event. Thereby, it is possible to prevent events between a plurality of calendar systems from overlapping each other.

According to another aspect of the invention, there is provided an information processing method including setting an event so as to correspond to the date of the calendar; and setting an access right to the calendar or the event, wherein, in the setting of the event, if the event is also set in another calendar, an event having only correlation with the event is generated so as to be set in another calendar, and, if contents of the event are changed, the changed contents thereof are also reflected in the contents of the event having only correlation with the event.

According to the aspects of the invention, it is possible to provide an information processing apparatus, an image processing method, and program, capable of reducing an operation burden on a user by sharing events and information related to the events between a plurality of calendars and by an administrator setting an access right.

BRIEF DESCRIPTION OF THE DRAWINGS

The invention will be described with reference to the accompanying drawings, wherein like numbers reference like elements.

FIG. 5 is a diagram illustrating an example of the calendar list data structure.

FIG. 7 is a diagram illustrating an example of the account list data structure.

FIG. 9 is a diagram illustrating a display example of the calendar screen.

FIG. 10 is a diagram illustrating an example of the event list data structure.

FIG. 11 is a diagram illustrating a display example of the calendar screen.

FIG. 12 is a diagram illustrating an example of the calendar list data structure.

FIG. 13 is a diagram illustrating an example of the event list data structure.

FIG. 14 is a diagram illustrating a display example of the calendar screen.

FIG. 15 is a diagram illustrating an example of the calendar list data structure.

FIG. 16 is a diagram illustrating an example of the account list data structure.

FIG. 17 is a diagram illustrating an example of the event list data structure.

DESCRIPTION OF EXEMPLARY EMBODIMENTS

Figure 1:
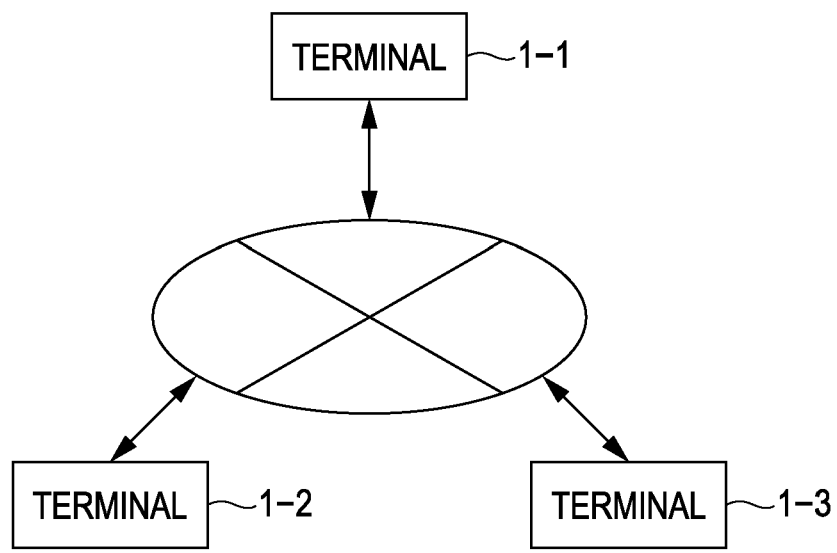
FIG. 1 is a diagram illustrating a configuration example of the schedule management system according to an embodiment of the invention.

Configuration of Schedule Management System According to Embodiment of Invention FIG. 1 is a diagram illustrating a configuration example of the schedule management system according to an embodiment of the invention. The schedule management system includes terminals 1-1, 1-2 and 1-3 connected to each other via a network 2. In a case where it is not necessary to differentiate the terminals 1-1, 1-2 and 1-3 from each other, they are simply referred to as a terminal 1. In addition, the number of the terminal 1 is arbitrary, and is not limited to three as shown in FIG. 1.

The terminal 1 is a computer system (information processing apparatus) including a CPU (Central Processing Unit), a ROM (Read Only Memory), a RAM (Random Access Memory), an HDD (Hard Disk Drive), and the like. So-called application software for a calendar which manages a schedule can be executed on the terminal 1, and the terminal 1 can set events and access rights to the calendars (schedule tables) which can be inspected on the computer system and can make image data to be shared, in response to an operation from a user, through the execution of the application software. In addition, the terminal 1 creates an alias of the event set in the calendar, and can share event contents by attaching (preserving) the created alias to another calendar.

Further, the alias is an information copying tool (a branch of a file or a folder) and is a generic name in Mac (registered trademark). For example, the alias is called "shortcut" in Windows (registered trademark) and is called "symbolic link" in UNIX (registered trademark). If, in a state where an entity of a file is preserved in the original folder, an alias of the file is creased and is preserved in another folder, the alias acts as if the entity is operated when the alias is operated. For example, it is possible to perform an operation such as opening a file using the alias.

In the embodiment of the invention, in a state where most of functions of an event is left in an original calendar A as an entity, the alias is created in another calendar B as an event having only correlation with the event. The alias looks like a typical event in the calendar B, but if the event contents are changed on the calendar A, the change is also performed (reflected) on the calendar B. In addition, only the access right is treated differently in the calendar A and the calendar B. In other words, the alias created in the calendar B acts according to an access right (reference only) to the calendar B (can make a reference only). However, since a changing operation of the event contents adds a change on the calendar A, only a user having an access right to the calendar A can perform the changing operation.

Further, the terminal 1 can correlate a calendar with a picture (image data). For example, the terminal 1 may specify which event is related with photographed image data from photographing information such as photographing time point or information (camera ID or user ID) for uniquely identifying a digital camera used for photographing, and may correlate the specified event with a calendar.

The network 2 may be a wired or wireless network such as a public network, a local area network or the Internet, or digital satellite broadcasting.

Figure 2:
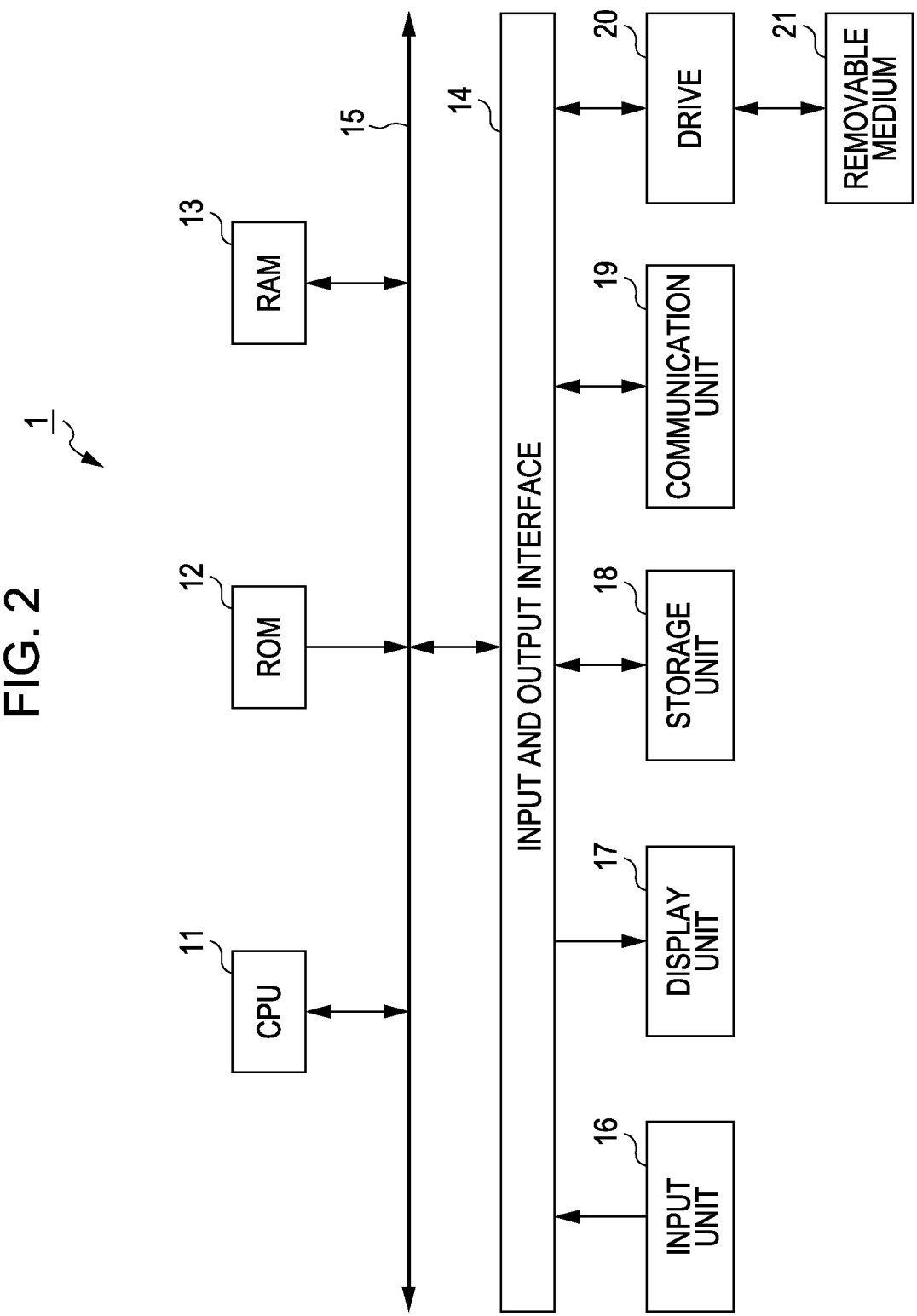
FIG. 2 is a diagram illustrating a configuration example of the terminal.

FIG. 2 is a diagram illustrating a configuration example of the terminal 1. The terminal 1 includes a CPU 11, a ROM 12, a RAM 13, and an input and output interface 14 which are connected to each other via a bus 15, and includes an input unit 16, a display unit 17, a storage unit 18, a communication unit 19, and a drive 20, which are connected to the input and output interface 14.

The CPU 11 reads and executes a boot program for activating the terminal 1 from the ROM 12 in response to an input signal from the input unit 16, so as to read various operating systems stored in the storage unit 18. In addition, the CPU 11 performs various controls or reads programs and data stored in the ROM 12 or the storage unit 18 so as to be loaded to the RAM 13 in response to an input signal from the input unit 16, or performs a series of processes such as operating or processing of data in response to commands of the program read from the RAM 13.

The input unit 16 includes an input device such as a keyboard or a mouse for an operator of the terminal 1 inputting a variety of operations, generates an input signal based on an operation of the operator, and transmits the generated input signal to the CPU 11 via the input and output interface 14 and the bus 15.

The display unit 17 is, for example, a liquid crystal display or a speaker, and displays a process result of the CPU 11 or outputs sound based on a signal received from the CPU 11 via the bus 15 and the input and output interface 14.

The storage unit 18 includes a semiconductor memory or a magnetic disk, and stores programs or data executed by the CPU 11. The storage unit 18 stores, for example, a schedule management application or an image management application, as the programs executed by the CPU 11.

The communication unit 19 includes an LAN (Local Area Network) card or a modem, and allows the terminal 1 to be connected to the network 2 which is a communication medium such as a local area network or the Internet. That is to say, the communication unit 19 transmits data received from the communication medium to the CPU 11 via the input and output interface 14 and the bus 15, and transmits data from the CPU 11 via the bus 15 and the input and output interface 14 to the network 2.

The drive 20 displays data read from a removable medium 21 on the display unit 17 via the input and output interface 14 under the control of the CPU 11.

Figure 3:
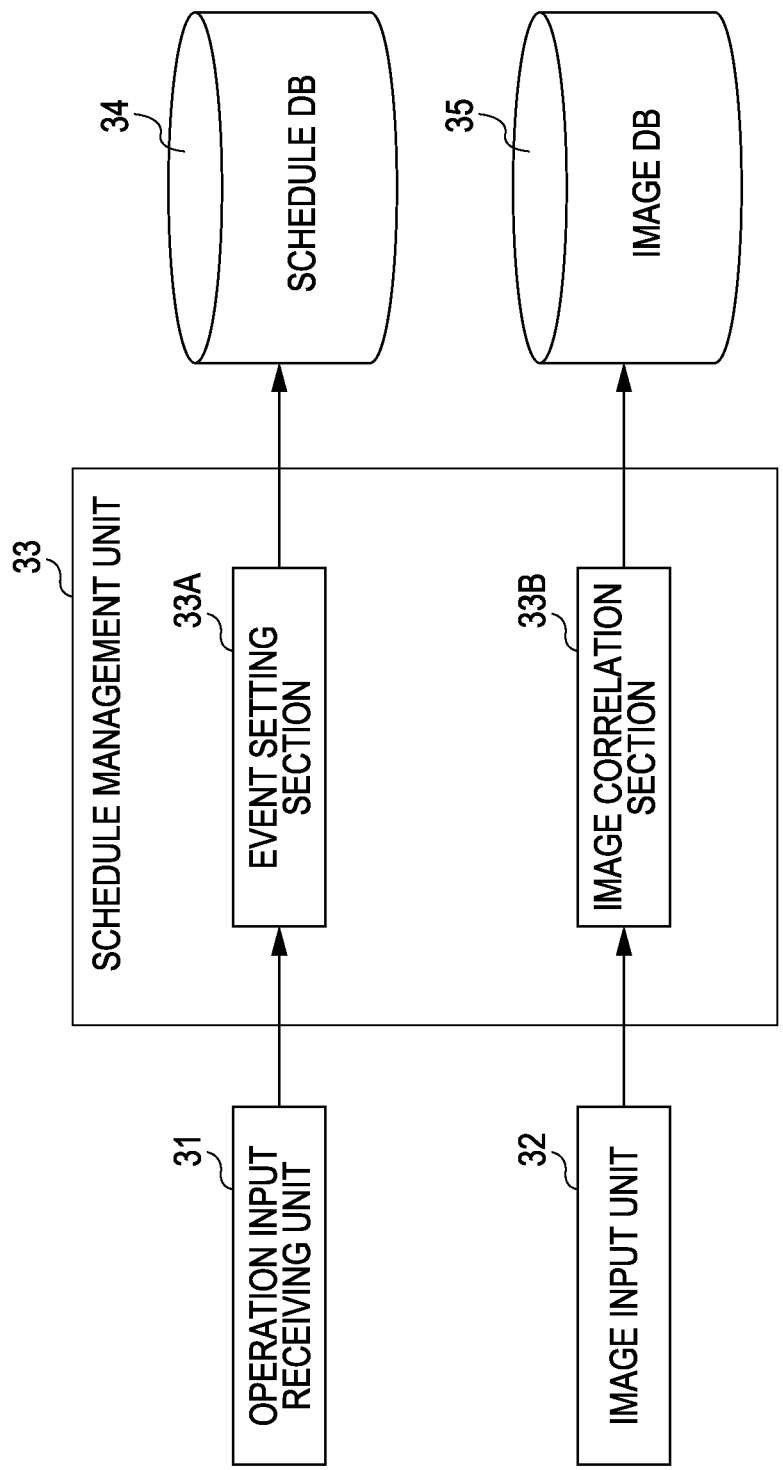
FIG. 3 is a block diagram illustrating a functional configuration example of the terminal.

FIG. 3 is a block diagram illustrating a functional configuration example of the terminal 1. At least a part of the function units shown in FIG. 3 is realized by the CPU 11 reading and executing the schedule management application, the image management application, or the like.

An operation input receiving unit 31 receives a variety of operations such as an information input or information selection which a user performs using the input unit 16 from the screen displayed on the display unit 17, and supplies the operation contents to an event setting section 33A of the schedule management unit 33.

An image input unit 32 receives image data read from the removable medium 21 via the drive 20, image data acquired from other devices via the communication unit 19, and image data stored in the storage unit 18, and supplies the image data to an image correlation section 33B of the schedule management unit 33.

The schedule management unit 33 includes the event setting section 33A and the image correlation section 33B. The event setting section 33A sets calendars or accounts based on operation contents from the operation input receiving unit 31, and stores a list of the set calendars or accounts in a schedule database (DB) 34. In addition, the event setting section 33A sets events in a calendar based on operation contents from the operation input receiving unit 31, and stores a list of the set events in the schedule database (DB) 34.

The image correlation section 33B stores the image data supplied from the image input unit 32 in an image database (DB) 35, and correlates (shares) the image data with the event list stored in the schedule database 34 based on photographing information (photographing time point or camera ID) accompanied by the image data.

The schedule database 34 stores a calendar list, an account list, and an event list which are set by the event setting section 33A. The image database 35 stores image data supplied from the image correlation section 33B.

First Embodiment of Invention

Next, an example where events (schedules for lessons, club activities, the activities of the school year, and the like) for each class of the school are shared will be described as the first embodiment. In other words, the terminals 1-1, 1-2 and 1-3 shown in FIG. 1 are terminals of teachers of students who are allowed to access the schedule management system of the school.

First, a process of setting a calendar list will be described with reference to the flowchart of FIG. 4.

In step S1, the operation input receiving unit 31 determines whether or not an administrator instructs creation of a calendar list, and waits until creation of calendars is instructed. In addition, the only administrator who is allowed to create calendars is, for example, a teacher, and it is necessary to register user ID and password in advance in order to receive permission of the calendar creation. In addition, in a case where the pre-registered administrator instructs the calendar creation, the CPU 11 displays a calendar creation screen (not shown) on the display unit 17.

In step S1, if it is determined that the pre-registered administrator instructs the calendar creation, the flow proceeds to step S2, and the operation input receiving unit 31 receives data input related to the calendar. For example, the administrator (teacher) sets a calendar name, references referring to the calendar (grades, classes, club activities, subjects of study, and the like), and an access right on the calendar creation screen displayed on the display unit 17.

In step S3, the event setting section 33A of the schedule management unit 33 sets a calendar list based on the data related to the calendar, received in step S2, and registers (stores) the calendar list in the schedule database 34.

Figure 4:
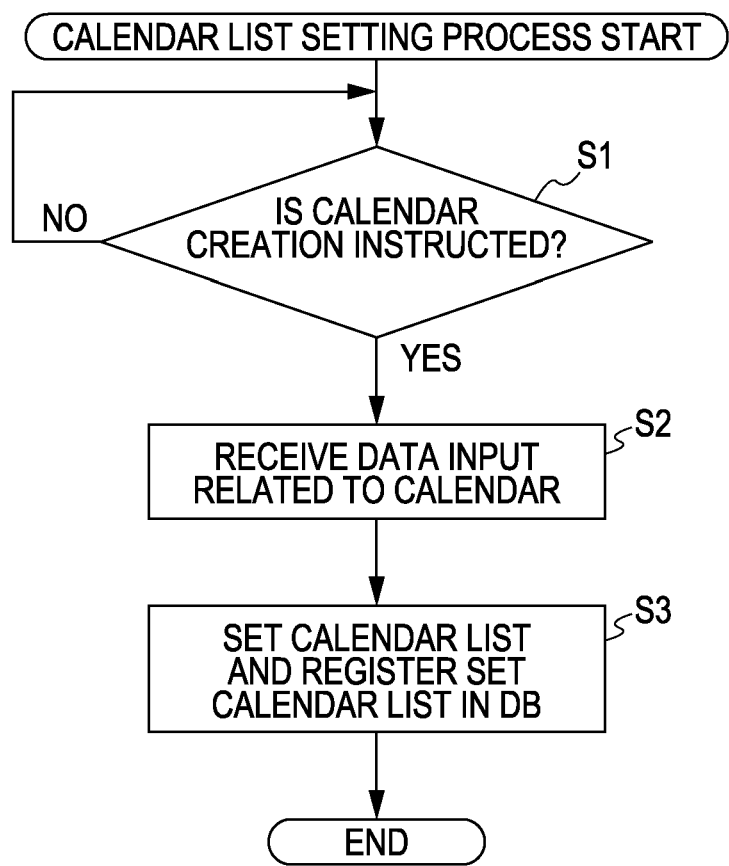
FIG. 4 is a flowchart illustrating a calendar list setting process.

FIG. 5 is a diagram illustrating an example of the data structure of the calendar list set through the process in FIG. 4.

As shown in the example of FIG. 5, the calendar name "whole school" calendar is set in the "calendar 0" item, the calendar name "school year (the first grade)" calendar is set in the "calendar 1" item, the calendar name "school year (the second grade)" calendar is set in the "calendar 2" item, the calendar name "school year (the third grade)" calendar is set in the "calendar 3" item, the calendar name "class (first grade, class 1)" calendar is set in the "calendar 4" item, the calendar name "class (second grade, class 2)" calendar is set in the "calendar A" item, the calendar name "class (second grade, class 3)" calendar is set in the "calendar B" item, the calendar name "subject of study (Japanese, teacher B)" calendar is set in the "calendar C" item, the calendar name "subject of study (English, teacher C)" calendar is set in the "calendar D" item, the calendar name "club activity (soccer club)" calendar is set in the "calendar E" item, the calendar name "school trip, second grade, class 3, group B" calendar is set in the "calendar F" item, and the calendar name "school trip, second grade, class 3, group C" calendar is set in the "calendar G" item. In addition, calendar data (data including the date, day of the week, time point) is correlated with each item.

As such, a plurality of calendars are registered in the calendar list, and events or images can be shared between a plurality of calendars.

Next, a process of setting an account list will be described with reference to the flowchart of FIG. 6. The account refers to a right for a user using a specific calendar.

In step S11, the operation input receiving unit 31 determines whether or not the administrator instructs creation of accounts, and waits until creation of accounts is instructed. In addition, the only administrator who is allowed to create accounts is, for example, a teacher, and it is necessary to register user ID and password in advance in order to receive permission of the account creation. In addition, in a case where the pre-registered administrator instructs the account creation, the CPU 11 displays an account creation screen (not shown) on the display unit 17.

In step S11, if it is determined that the pre-registered administrator instructs the account creation, the flow proceeds to step S12, and the operation input receiving unit 31 receives data input related to the calendar. For example, the administrator (teacher) sets an account name, assigned calendars which can be used by the corresponding account, and an access right (authority) on the account creation screen displayed on the display unit 17.

In step S13, the event setting section 33A of the schedule management unit 33 sets an account list based on the data related to the account, received in step S12, and registers (stores) the account list in the schedule database 34.

Figure 6:
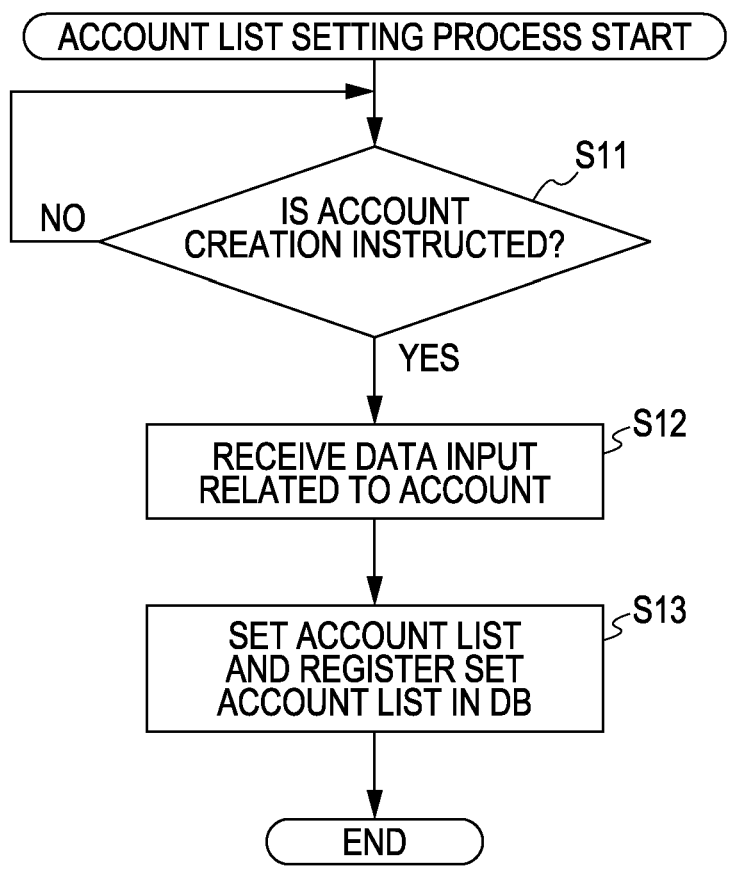
FIG. 6 is a flowchart illustrating an account list setting process.

FIG. 7 is a diagram illustrating an example of the data structure of the account list set through the process in FIG. 6.

As shown in the example of FIG. 7, in the account name "vice-principal A", "all the calendars" are set as assigned calendars, and the access right (authority) of "administrator" is set. In the account name "teacher B (in charge of the second grade, class 2, a head teacher of the second grade, Japanese)", the "calendar 2", the "calendar A", and the "calendar C" are set as the assigned calendar, the access right of "administrator" is set, and "any other" calendar is set as the assigned calendar and the access right of "reference" is set. In other words, since the teacher B is in charge of the second grade, the class 2, is a head teacher of the second grade, and a subject of study in charge is Japanese (refer to FIG. 5), the teacher B has an authority of administrator for the calendars and can only refer to other calendars.

In the account name "teacher C (in charge of the second grade, class 3, English, a soccer club adviser)", the "calendar B", the "calendar D", the "calendar E", and the "calendar F" are set as the assigned calendar, the access right of "administrator" is set, and "any other" calendar is set as the assigned calendar and the access right of "reference" is set. I in the account name "student D (the second grade, class 2, a soccer club head)", the "calendar 0", the "calendar 2", and the "calendar A" are set as the assigned calendar, the access right of "reference" is set, and the "calendar E" is set as the assigned calendar and the access right of "user" is set. That is to say, since the student D is a student of the second grade, class 2, the student D can only refer to the calendar 2 of the second grade, and the calendar A of the second grade, class 2, but since the student D is a soccer club head, the student D has the authority of a user (capable of setting events). In addition, the term "2009.04.01 to 2012.03.31" is set in the assigned calendar of the "student D", which indicates that the calendars are valid calendars within the term.

In the account name "student E (the second grade, class 3, head of school trip group B)", the "calendar 0", the "calendar 2", and the "calendar B" are set as the assigned calendar, and the access right of "reference" is set, and the "calendar F" is set as the assigned calendar and the access right of "user" is set. That is to say, since the student E is a student of the second grade, class 3, the student E can only refer to the calendar 2 of the second grade, and the calendar B of the second grade, class 3, but since the student E is a head of school trip group B, the student E has an authority of user for the calendar F of the school trip group B. In the account name "student F (the second grade, class 2, soccer club, school trip group B)", the "calendar 0", the "calendar 2", the "calendar B", the "calendar E", and the "calendar F" are set as the assigned calendar, and the access right of "reference" is set. In the account name "student G (the second grade, class 3, school trip group C)", the "calendar 0", the "calendar 2", the "calendar B", and the "calendar G" are set as the assigned calendar, and the access right of "reference" is set.

As such, in the account list, a plurality of accounts are registered, and the assigned calendars are set for each account, and the access rights are set for each calendar.

Next, a process of setting an event list will be described with reference to the flowchart of FIG. 8. Events in the first embodiment refer to schedules for lessons, school assembly, school meals, club activities, and the like.

In step S21, the operation input receiving unit 31 determines whether or not a user instructs creation of events, and waits until creation of events is instructed. In addition, a user who is allowed to create events is only a teacher or a club head whose access right is set as an administrator or a user, and thus whether or not to create events is determined based on log-in user ID and password by referring to the account list. In addition, in a case where a user allowed to create events instructs the event creation, the CPU 11 displays a screen for inputting events on the display unit 17.

For example, if the user moves a cursor 102 for selecting several days to a column of a desired day on a calendar screen 101, shown in FIG. 9, displayed on the display unit 17 of the terminal 1, and instructs creation of events, an event input window 103 is displayed. The event input window 103 includes a title, a start time point, an end time point, a file box for attaching files related to the corresponding event, and an alias box for setting an alias of the corresponding event.

In step S21, if it is determined that the pre-registered user instructs the event creation, the flow proceeds to step S22, and the operation input receiving unit 31 receives data input related to the event. For example, the administrator inputs data related to the event on the event input window 103 shown in FIG. 9, and presses the OK button.

In step S23, the event setting section 33A of the schedule management unit 33 sets a calendar list based on the data related to the event, received in step S22, and registers (stores) the event list in the schedule database 34.

Figure 8:
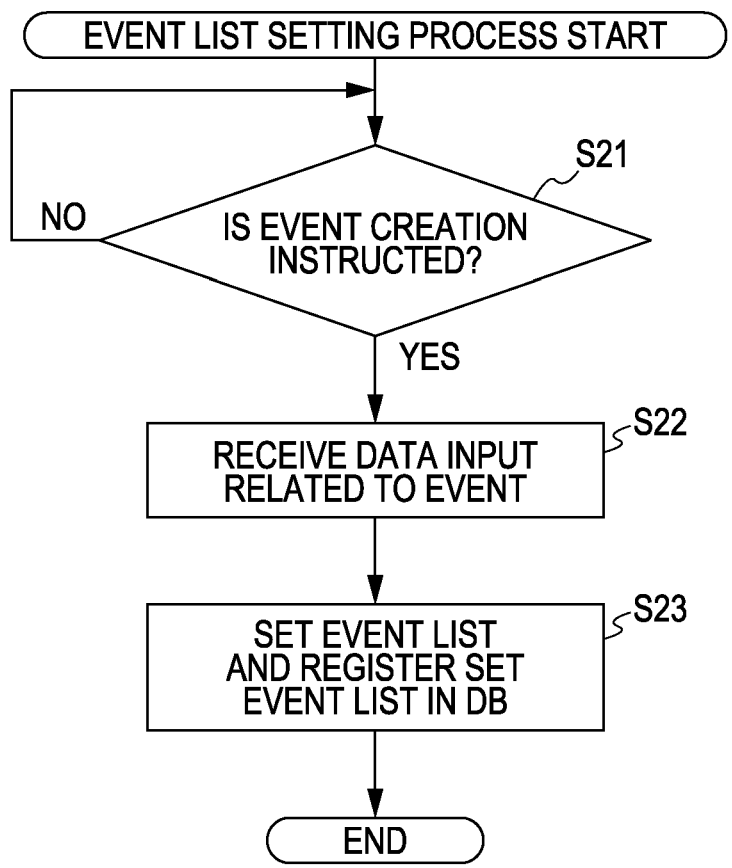
FIG. 8 is a flowchart illustrating an event list setting process.

FIG. 10 is a diagram illustrating an example of the data structure of the event list set through the process in FIG. 8.

As shown in the example of FIG. 10, in the "event 1 (calendar 0)" item, the name "school assembly", the start time point "2010/04/03, 09:00", and the end time point "2010/04/03, 09:45" are set. In the "event 2 (calendar 0)" item, the name "school meals", the start time point "2010/04/03, 12:00", the end time point "2010/04/03, 13:00", and the attribute "repetition on weekdays" are set. That is to say, the event of school meals at "12:00 to 13:00" on weekdays is set in the whole school calendar 0. In the "event 3 (calendar C)" item, the name "Japanese, the second grade, class 2", the start time point "2010/04/03, 11:00", the end time point "2010/04/03, 11:45", and the attribute "repetition on Mondays" are set. That is to say, the event where Japanese is taught in the second grade, class 2, at "11:00 to 11:45" on Mondays is set in the calendar C of Japanese. In the "event 4 (calendar D)" item, the name "English, the second grade, class 2", the start time point "2010/04/03, 13:00", the end time point "2010/04/03, 13:45", and the attribute "repetition on Mondays" are set.

In the "event 5 (calendar A)" item, the name "Japanese, the second grade, class 2", the start time point "2010/04/03, 11:00", the end time point "2010/04/03, 11:45", and the attribute "alias of the event 3" are set. That is to say, the alias of the event where Japanese is taught at "2010/04/03, 11:00 to 11:45" is set in the calendar A of the second grade, class 2. In order to set information of the "event 5", the administrator (teacher B) moves the cursor 102 to the column "2010/4/3" on the calendar screen 101 of the calendar C of Japanese and instructs creation of the event. The administrator sets the title "Japanese, the second grade, class 2", the start time point "11:00", the end time point "11:45" and sets "the second grade, class 2" in the alias box on the event input window 103 shown in FIG. 9. Thereby, the alias of the "event 3" is generated in the calendar A of the second grade, class 2, and the entity of the event is present in the calendar C of the teacher B.

In the "event 6 (calendar A)" item, the name "English, the second grade, class 2", the start time point "2010/04/03, 13:00", the end time point "2010/04/03, 13:45", and the attribute "alias of the event 4" are set. In the "event 7 (calendar 2)" item, the name "school trip", the start time point "2010/04/05, all day long", and the end time point "2010/04/07, all day long" are set. In the "event 8 (calendar 2)" item, the name "gathering", the start time point "2010/04/05, 08:00", the end time point "2010/04/05, 08:30", and the attribute "dependence on the event 7" are set. That is to say, the event where the gathering for the school trip is performed at "2010/04/05, 08:00 to 08:30" is set in the calendar 2 of the second grade. The "dependence" refers to an attribute indicating an event included in a certain event. Therefore, it can be seen that the "gathering" of the event 8 is included in the "school trip" of the event 7.

In the "event 9 (calendar 2)" item, the name "free activities, the start time point "2010/04/06, 13:15", the end time point "2010/04/06, 18:15", and the attribute "dependence on the event 7" are set. In the "event 10 (calendar A)" item, the name "school trip", the start time point "2010/04/05, all day long", the end time point "2010/04/07, all day long", and the attribute "alias of the event 7" are set. In other words, the alias of the "event 7" is generated in the calendar A of the second grade, class 2, and the entity of the event is present in the calendar 2 side of the second grade. In the "event 11 (calendar F)" item, the name "free activities, the start time point "2010/04/06, 13:15", the end time point "2010/04/06, 18:15", and the attribute "alias of the event 9" are set.

As such, in the event list, a plurality of events are registered, and the assigned calendars are set for each event. As a result, the access rights are set for each event. In addition, the alias is used in a plurality of events set in the event list, and thereby the events can be shared between a plurality of calendars.

In addition, in step S23, if a picture (image data) having predetermined photographing information is input, the event setting section 33A of the schedule management unit 33 performs sharing settings for correlating the image data with a corresponding event. Thereby, the image correlation section 33B can specify an event based on the photographing information accompanied by the image data acquired from the image input unit 32, and easily correlate (share) the image data with the specified event. In other words, since the photographed image data is uploaded and is correlated with the event, and thus the image data is automatically shared in the event without a particular operation of a user. In this way, materials (documents and files) used for lessons can be shared in the event.

As described above, the calendar list, the account list, and the event list are registered in the schedule database 34. For example, when the student D, who is a soccer club head, of the second grade, class 2, is logged in the terminal 1 and instructs all the calendars (the calendar 0, the calendar 2, the calendar A, and the calendar E) to which the student D belongs to be displayed (FIG. 7), the CPU 11 displays a calendar screen 111 as shown in FIG. 11 on the display unit 17. Information (mark) indicating the event "Japanese" is displayed on the calendar screen 111. Although the event 5 of "Japanese" looks like a typical event on the display, it is an alias, and an entity of the event is present in the calendar C of Japanese. If the teacher B changes the contents (event 3) of Japanese of the second grad, class 2 on the calendar C of Japanese, the changed contents are reflected in the calendar A in which the alias is generated.

Although, the student D summarizes the calendars to which the student belongs into one calendar so as to be displayed in the example shown in FIG. 11, the invention is not limited thereto, and calendars may be built suitable for the operability of a user by displaying only a selected calendar, or by displaying a plurality of calendars in an overlapping manner.

In addition, in order to clearly visually show the alias, a background color of the information indicating the event may be changed, or styles, colors or sizes of fonts may be changed.

In addition, in some cases, it is necessary to differently represent information displayed on the calendar in which the alias is generated and information displayed on the calendar in which the entity of the event is present. For example, in a case where information of "the second grade, class 2" is desired to be displayed on the calendar C which is displayed by the Japanese teacher B, and information of "Japanese" is desired to be displayed on the calendar A which is displayed by the student D, a title which is the same as in the attribute of the original event may be given to the attribute of the alias side.

Effects of First Embodiment of the Invention

1. Since an alias is generated, thus dependency is given between the events, and thereby settings of the parent event are reflected in the children events, there is no necessity of finely setting events in each calendar even if a plurality of calendars are prepared, and thereby an improvement in operability can be expected.

2. Image data or other documents (files) are correlated with an event the calendar, and thereby the searchability of the image data or the document can be improved. In addition, since the events have dependency, if the image data or the documents can be correlated with the parent event, they can also be correlated with the children events.

3. A sharing method according to an access right to a calendar can be provided, and thus sharing is possible without necessity of users other than the administrator of access rights setting access rights.

4. If an event is correlated with image data related to the event, a group of the image data is generated thus a new title can be given to the group, and thereby sharing with other persons is possible with the group units. Since the calendar is used to set an event (schedule), if a setting of image data being or not being shared and a method of publishing image data when the event is set are defined, the image data can be shared at the same time (live) as photographing, and a notification indicating that the image data is published can be automatically performed.

5. Further, at this time, there may be provided a device for selecting whether or not the setting of the image data being or not being shared is set as an access right to the calendar, or whether or not a separate access right is separately set with the event units. Thereby, it is possible to separately change not only an access right to the calendar or to an access right to the event.

6. There may be provided a device for setting a default value for the setting of the image data being or not being shared, or the setting of an access right for each event. Thereby, it is possible to simplify setting operations which tend to be burdensome.

7. When synchronization with other schedule (calendar) management systems is performed, overlapping can be prevented by omitting either a parent event or a child event which overlaps each other by the alias.

Second Embodiment of Invention

Next, an example where two courses are prepared as the school trip and such events sharing such an event are created will be described as the second embodiment. First, the terminal 1 sets a calendar list as described using the flowchart of FIG. 4 according to the first embodiment. Thereby, the calendar list as shown in FIG. 12 is registered in the schedule database 34.

As shown in FIG. 12, a calendar list is generated by adding the "calendar H", "calendar I" and "calendar J" items to the calendar list shown in FIG. 5. The calendar name "school trip criterion calendar" is set in the "calendar H" item, the calendar name "school trip, course A" is set in the "calendar I" item, and the calendar name "school trip, course B" is set in the "calendar J" item.

After the calendar list is set, the terminal 1 sets an account list as described with reference to the flowchart of FIG. 6 and sets an event list as described with reference to the flowchart of FIG. 8 in the first embodiment. Thereby, the event list as shown in FIG. 13 is registered in the schedule database 34.

As shown in FIG. 13, the name "school trip", the start time point "2010/04/05, all day long", and the end time point "2010/04/07, all day long" are set in the "event 7 (calendar H)". The name "gathering", the start time point "2010/04/05, 8:00", the end time point "2010/04/05, 8:30", the attribute "dependence on the event 7" are set in the "event 8 (calendar H)". The name "school trip", the start time point "2010/04/05, all day long", the end time point "2010/04/07, all day long", and the attribute "alias of the event 7" are respectively set in the "event 9 (calendar I)" and the "event 15 (calendar J)". That is to say, the alias of the "event 7" is generated in the calendar I of the school trip, course A and the calendar J of the school trip, course B, and the entity of the event is present in the calendar H side of the school trip criterion.

In addition, the attribute "dependence on the event 9" is set in the "event 10" item to the "event 14" item, and the attribute "dependence on the event 15" is set in the "event 16" item and the "event 17" item. That is to say, the "event 10" to the "event 14" are included in an event of the "school trip" of the event 9 (calendar I), and the "event 16" and the "event 17" are included in an event of the "school trip" of the event 15 (calendar J). However, since the alias of the "event 7" is set in the "event 9" and the "event 15", the entities of the "event 10" to the "event 14", and the "event 16" and the "event 17" are also present in the calendar H side of the school trip criterion.

For example, if the administrator displays the calendar J of the school trip, course B on the display unit 17, and changes the name "xxx temple" and the name "xxx museum", the entities of the events are set as the calendar J of the school trip, course B. The other events are still present in the calendar H side of the school trip criterion. In addition, the calendar I of the school trip, course A has the same contents as the calendar H of the school trip criterion. As such, it is possible to easily set the two events, the school trip, course A where "xxx temple" is first studied by observation, and the school trip, course B where "xxx museum" is first studied by observation.

As described above, the calendar list, the account list, and the event list are registered in the schedule database 34. For example, when a student, who studies by observation the school trip, course B, of the second grade, class 2, is logged in the terminal 1 and instructs all the calendars to which the student belongs to be displayed, the CPU 11 displays a calendar screen 121 as shown in FIG. 14 on the display unit 17. Although all the events look like a typical event on the display, entities of only the events "xxx temple" and "xxx museum" where the course change has been performed are present on the calendars, and other events are all aliases, and entities thereof are present in other calendar sides.

Effects of Second Embodiment of the Invention

1. A timetable or an event such as school activities can be shared, and free activities for each class in the school trip are also included, thereby enabling various uses.

2. As described in the first embodiment, an event can be correlated with image data related to the event. Thereby, a travel report in the school trip can be shared.

Third Embodiment of Invention

Next, an example where a calendar for sharing events (schedule of meeting or training) for each division of a company will be described as the third embodiment. That is to say, the terminals 1-1, 1-2 and 1-3 shown in FIG. 1 are terminals of executives, general managers, general staff, and the like who are allowed to access the schedule management system of the company.

First, the terminal 1 sets a calendar list as described with reference to the flowchart of FIG. 4 in the first embodiment. Thereby, the calendar list as shown in FIG. 15 is registered in the schedule database 34.

As shown in FIG. 15, the calendar name "company calendar" is set in the "calendar 0" item, the calendar name "executive calendar" is set in the "calendar 1" item, the calendar name "division head calendar" is set in the "calendar 2" item, the calendar name "sales division calendar" is set in the "calendar 3" item, the calendar name "planning division calendar" is set in the "calendar 4" item, the calendar name "sales division, section 1 calendar" is set in the "calendar 5" item, the calendar name "sales division, section 2 calendar" is set in the "calendar 6" item, the calendar name "planning division, section 1 calendar" is set in the "calendar 7" item, the calendar name "planning division, section 2 calendar" is set in the "calendar 8" item, the calendar name "project A calendar" is set in the "calendar A" item, and the calendar name "project B calendar" is set in the "calendar B" item. In addition, calendar data (data including date, day of the week, and time point) are correlated with each item.

After the calendar list is set, the terminal 1 sets an account list as described with reference to the flowchart of FIG. 6 in the first embodiment. Thereby, the account list as shown in FIG. 16 is registered in the schedule database 34.

As shown in FIG. 16, in the account name "managing director", the "calendar 0", the "calendar 1", and the "calendar 2" are set as the assigned calendar, and the access right of "level A" is set. In the account name "sales division head", the "calendar 0", the "calendar 2", the "calendar 3", "calendar A", and the "calendar B" are set as the assigned calendar, and the access right of "level B" is set. In the account name "planning division head", the "calendar 0", the "calendar 2", the "calendar 4", "calendar A", and the "calendar B" are set as the assigned calendar, and the access right of "level B" is set. In the account name "sales division, section 1 chief", the "calendar 0", the "calendar 3", the "calendar 5", and "calendar A" are set as the assigned calendar, and the access right of "level C" is set. In the account name "planning division, section 2 chief", the "calendar 0", the "calendar 4", the "calendar 8", and "calendar A" are set as the assigned calendar, and the access right of "level C" is set. In the account name "sales division, section 1 senior staff C", the "calendar 0", the "calendar 3", the "calendar 5", and "calendar A" are set as the assigned calendar, and the access right of "level D" is set. In the account name "planning division, section 2 D", the "calendar 0", the "calendar 4", the "calendar 8", and "calendar A" are set as the assigned calendar, and the access right of "level E" is set.

The access rights have several layers of security levels, and are set for each account. In the example shown in FIG. 16, there are five layers of A to E of security levels, and a relationship between the access rights thereof is A⊃B⊃C⊃D⊃E. In other words, D includes objects allowed to be accessed by E and is allowed to access other objects, C includes objects allowed to be accessed by D and is allowed to access other objects, B includes objects allowed to be accessed by C and is allowed to access other objects, and A includes objects allowed to be accessed by B and is allowed to access other objects. The security levels of the access right are set for an object attached to an event, a calendar access right and an account security level is set for both the event of the calendar A and the alias of the calendar B, and thereby only an object which is allowed by both of them can be accessed.

After the account list is set, the terminal 1 sets an event list as described with reference to the flowchart of FIG. 8 in the first embodiment. Thereby, the event list as shown in FIG. 17 is registered in the schedule database 34.

As shown in FIG. 17, the name "holiday", the start time point "2010/04/06, all day long", and the end time point "2010/04/06, all day long" are set in the "event 1 (calendar 0)". The name "senior staff training", the start time point "2010/04/03, 12:00", the end time point "2010/04/03, 13:00", the attribute "restriction=sales division, section 1 D" are set in the "event 2 (calendar 0)". The name "division head regular meeting", the start time point "2010/04/03, 10:00", the end time point "2010/04/03, 12:00", the attribute "repetition on Mondays" are set in the "event 3 (calendar 2)". The name "division head regular meeting", the start time point "2010/04/03, 10:00", the end time point "2010/04/03, 12:00", the attribute "alias of the event 3" are set in the "event 4 (calendar 3)". The name "marketing meeting", the start time point "2010/04/04, 13:00", and the end time point "2010/04/04, 15:00" are set in the "event 5 (calendar 3)". The name "planning and research meeting", the start time point "2010/04/06, 13:00", and the end time point "2010/04/06, 15:00" are set in the "event 6 (calendar 4)".

The name "sales division, section 1 regular meeting", the start time point "2010/04/06, 13:00", and the end time point "2010/04/06, 15:00" are set in the "event 7 (calendar 5)". The name "project A report meeting", the start time point "2010/04/07, 09:30", and the end time point "2010/04/07, 12:00" are set in the "event 8 (calendar A)". The name "project B strategy meeting", the start time point "2010/04/07, 09:30", and the end time point "2010/04/07, 12:00" are set in the "event 9 (calendar B)". The name "marketing meeting", the start time point "2010/04/04, 13:00", the end time point "2010/04/04, 15:00", and the attribute "alias of the event 5" are set in the "event 10 (calendar 2)". The name "planning and research meeting", the start time point "2010/04/06, 13:00", the end time point "2010/04/06, 15:00", and the attribute "alias of the event 6" are set in the "event 11 (calendar 2)". The name "marketing meeting", the start time point "2010/04/04, 13:00", the end time point "2010/04/04, 15:00", and the attribute "alias of the event 10" are set in the "event 12 (calendar 4)". The name "planning and research meeting", the start time point "2010/04/06, 13:00", the end time point "2010/04/06, 15:00", and the attribute "alias of the event 11" are set in the "event 13 (calendar 3)".

In addition, in order to set information of the "event 4", the administrator (sales division head) moves the cursor 102 to the column "2010/4/3" on the calendar screen 101 (FIG. 9) of the calendar 2 of the division head, and instructs creation of a calendar. In addition, the administrator sets the title "division head regular meeting", the start time point "10:00", and the end time point "12:00" and sets the "sales division" in the alias box on the event input window 103. Thereby, the alias of the "event 3" is generated in the calendar 3 of the sales division, and the entity of the event is presented in the calendar 2 side of the division head.

Figure 18:
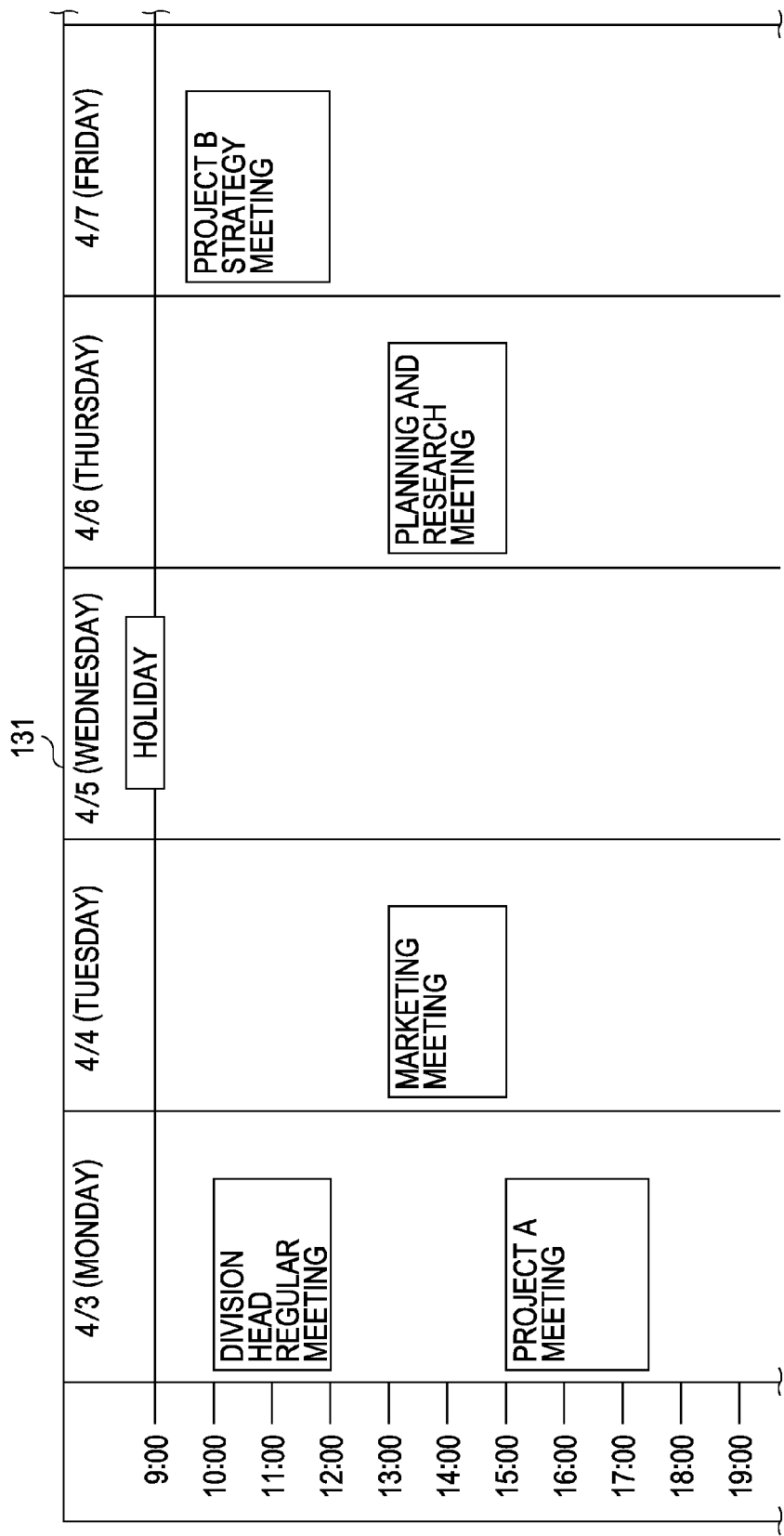
FIG. 18 is a diagram illustrating a display example of the calendar screen.
Figure 19:
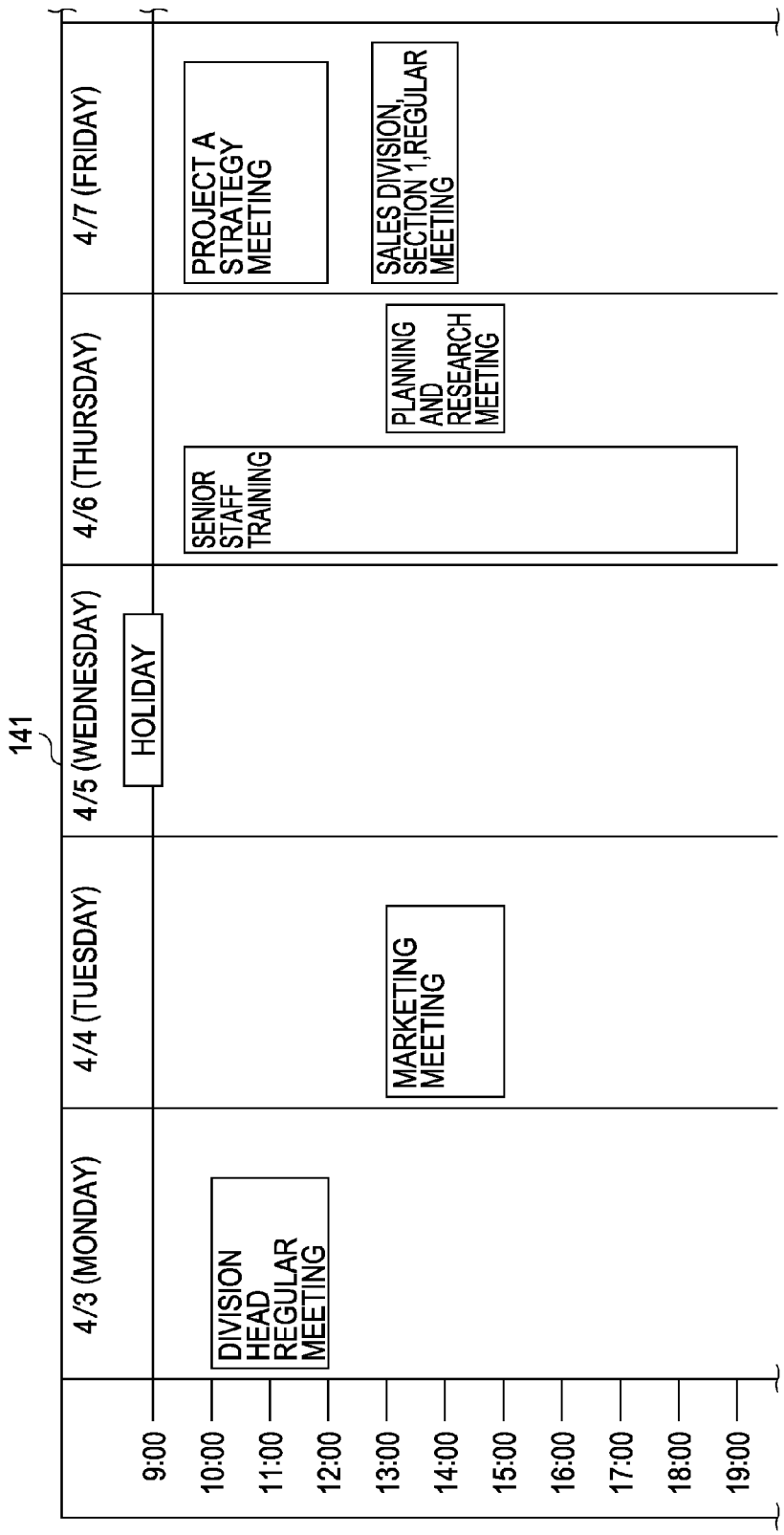
FIG. 19 is a diagram illustrating another display example of the calendar screen.

As described above, the calendar list, the account list, and the event list are registered in the schedule database 34. For example, when the sales division head is logged in the terminal 1 and instructs all the calendars (the calendar 0, the calendar 2, the calendar 3, the calendar A, and the calendar B) to which the sales division head belongs to be displayed, the CPU 11 displays a calendar screen 131 as shown in FIG. 18 on the display unit 17. In contrast, for example, when the sales division, section 1 senior staff C is logged in the terminal 1 and instructs all the calendars (the calendar 0, the calendar 3, the calendar 5, and the calendar A) to which the sales division head belongs to be displayed, the CPU 11 displays a calendar screen 141 as shown in FIG. 19 on the display unit 17. Although all the events look like a typical event on the display, the event 4 "division head regular meeting" is an alias of the event 3, and the entity of the event is present in the division head calendar 2 side. The event 13 "planning and research meeting" is an alias of the event 11, and the entity of the event is present in the planning division calendar 4 side. The event 2 "senior staff training", the event 5 "marketing meeting", the event 7 "sales division, section 1 regular meeting", and the event 8 "project A report meeting" are entities.

Meanwhile, recent meeting forms include various types such as a Web meeting and a phone meeting. At present, when setting a meeting, an organizer sets a meeting form or distributes materials before and after the meeting through electronic mail or the like. It is necessary for the organizer to grasp who is convened and reliably reflect it on a meeting notice. However, information sharing after delivery thereof entirely belongs to a side which receives the materials and is thus treated only according to the common sense thereof. That is to say, security information which is set by a method following procedures from personal information is not used, but security is set depending on a user's capability.

Therefore, in the third embodiment, resource information such as a meeting room, or documents (files) such as meeting materials or minutes of a meeting are attached to an event such as a meeting in addition to schedule information. An access right is set in a calendar using the security information, and an access right is originally set in an added event. Therefore, it is not necessary to consider that a distribution destination sets sharing when an event is set, and if materials are attached to the corresponding event, the materials can be shared at the same time as the attachment. At this time, it is possible to notify a user by a device which automatically notifies an access right holding person of a message indicating that the materials have been distributed.

Effects of Third Embodiment of the Invention

1. It is possible to share information from an upper layer to a lower layer, or from the lower layer to the upper layer without the necessity of considering an access right, by generating an alias which is a main portion of the invention. In addition, for example, if a security level is set in advance for each user, and an inspectable range for each security level can be set for each attached material, the inspectable material can be partially common when information is shared from the upper layer to the lower layer. In addition, a use method such as delivering a meeting video image in real time can be provided.

2. The security levels can be differentiated from each other by naming, leveling, or setting default, or the like, or changing styles, colors, sizes of fonts.

Modified Example

There may be a provision of an access right set event (attendance privilege) where an event of a run-time table in a theater is set in a calendar, and access is allowed when seat reservation is accepted. For example, a user downloads privilege information which is shared in an event displayed (or accessible) after a seat for a movie is reserved, to a mobile phone thereof. In addition, a service is possible in which the user goes to the theater with the mobile phone and touches the mobile phone on a noncontact terminal provided in the theater, and then a file designated by the privilege information can be downloaded.

Meanwhile, the above-described series of processes may be performed by hardware or software. When a series of processes is performed by the software, programs constituting the software are installed from a recording medium to a so-called built-in computer, or, for example, a general personal computer which can execute various kinds of functions by installing various kinds of programs.

The invention is not limited to the embodiments as they are, but may form various inventions by embodying the constituent elements through modifications within the scope without departing from the spirit thereof at the time of implementation or by appropriately combining a plurality of constituent elements disclosed in the embodiments. For example, several constituent elements may be omitted from all the constituent elements shown in the embodiments. In addition, constituent elements over different embodiments may be appropriately combined with each other.

The entire disclosure of Japanese Patent Application No. 2011-077889, filed Mar. 31, 2011 is expressly incorporated by reference herein.

What is claimed is:

1. An information processing apparatus where a calendar is displayed and information can be input to the calendar, comprising:
   an event setting portion that sets an event so as to correspond to a date in the calendar;
   an access right setting portion that sets an access right to the calendar or the event that identifies a first set of one or more users authorized to edit the calendar or the event; and
   a processor that causes the event on the calendar to be displayed on a display unit, wherein
   the event setting portion generates an alias having only correlation with the event so as to set the event in another calendar as the alias,
   the access right setting portion sets an access right to the another calendar that identifies a second set of one or more users authorized to edit the another calendar,
   the processor causes the alias to be displayed on the another calendar on the display unit or on another display unit,
   if contents of the event in the calendar are changed by any user in the first set, the event setting portion changes the event and also reflects the changed contents thereof on contents of the alias in the another calendar such that the processor causing the alias to be displayed on the another calendar includes displaying the alias that reflects the changed contents of the event, and
   if contents of the alias in the another calendar are changed by any user in the second set, the event setting portion does not change the event unless any user in the first set changes the event.

2. The information processing apparatus according to claim 1, further comprising an information storage portion that stores the event set by the event setting portion along with the date.

3. The information processing apparatus according to claim 1, further comprising a sharing setting portion that shares a file or image data in the event as information related to the event, wherein if the event having only correlation with the event is set in the another calendar, the event setting portion also reflects the sharing of the file or the image data on the alias.

4. The information processing apparatus according to claim 3, further comprising a sharing propriety setting portion that sets whether or not the image data is shared when the event is set, wherein the sharing setting portion shares the image data in the event at the same time as photographing if the image data is set to be shared by the sharing propriety setting portion.

5. The information processing apparatus according to claim 4, wherein the sharing propriety setting portion sets either sharing of the image data or non-sharing of the image data as a default value.

6. The information processing apparatus according to claim 1, further comprising a selection portion that selects which access right to the calendar or the event is set, wherein the access right setting portion sets an access right based on the selection performed by the selection portion.

7. The information processing apparatus according to claim 6, wherein the selection portion selects either the calendar or the event as a default value.

8. The information processing apparatus according to claim 1, further comprising a display control portion that controls display of the calendar including the event set by the event setting portion, wherein the display control portion changes background colors, or styles, colors or sizes of fonts according to an event having only correlation with the event or a security level of the event.

9. The information processing apparatus according to claim 1, wherein in a case where there is an event overlapping the alias when synchronization with another calendar system managing the event is performed, the event setting portion omits any one event of an entity side of the event or the alias.

10. The information processing apparatus according to claim 1, wherein the another calendar includes a plurality of calendars, the event being set as the alias in each of the plurality of calendars.

11. An information processing method of an information processing apparatus where a calendar is displayed and information can be input to the calendar, comprising:
   setting an event so as to correspond to a date in the calendar;
   setting an access right to the calendar or the event that identifies a first set of one or more users authorized to edit the calendar or the event; and
   setting an access right to the another calendar that identifies a second set of one or more users authorized to edit the another calendar, wherein
   in the setting of the event, if the event is also set in the another calendar, an alias having only correlation with the event is generated so as to set the event in another calendar as the alias, if contents of the event in the calendar are changed by any user in the first set, the changed contents thereof are also reflected in contents of the alias in the another calendar, and if contents of the alias in the another calendar are changed by any user in the second set, the event is not changed unless any user in the first set changes the event.

12. The information processing method according to claim 11, further comprising:

displaying the event on the calendar on a display unit; and
displaying the alias on the another calendar on the display unit or on another display unit.

13. A non-transitory recording medium, having a program enabling a computer to perform information processes of an information processing apparatus where a calendar is displayed and information can be input to the calendar, the program enabling the computer to:

set an event so as to correspond to a date in the calendar;
set an access right to the calendar or the event that identifies a first set of one or more users authorized to edit the calendar or the event; and
set an access right to the another calendar that identifies a second set of one or more users authorized to edit the another calendar, wherein in the setting of the event, if the event is also set in the another calendar, an alias having only correlation with the event is generated so as to be set in the another calendar as the alias, if contents of the event in the calendar are changed by any user in the first set, the changed contents thereof are also reflected in contents of the alias in the another calendar, and if contents of the alias in the another calendar are changed by any user in the second set, the event is not changed unless any user in the first set changes the event.

14. The recording medium according to claim 13, wherein the program enables the computer to:

display the event on the calendar on a display unit; and
display the alias on the another calendar on the display unit or on another display unit.

* * * * *